April 14, 1931. M. SUBBER 1,800,967
AUTOMOBILE INDICATOR
Filed May 19, 1928  2 Sheets-Sheet 1
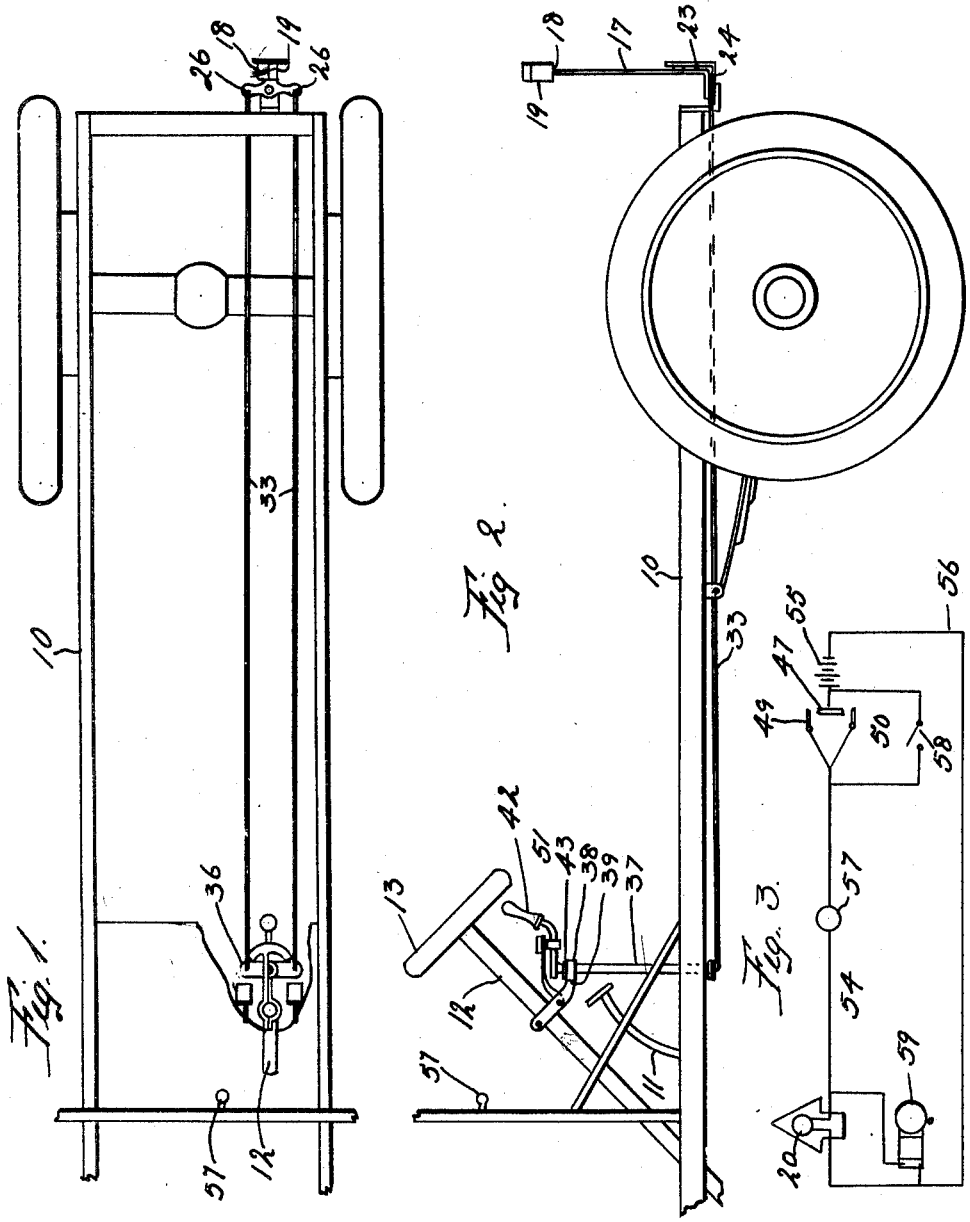
INVENTOR
Morris Subber
By W. W. Williamson
Atty.

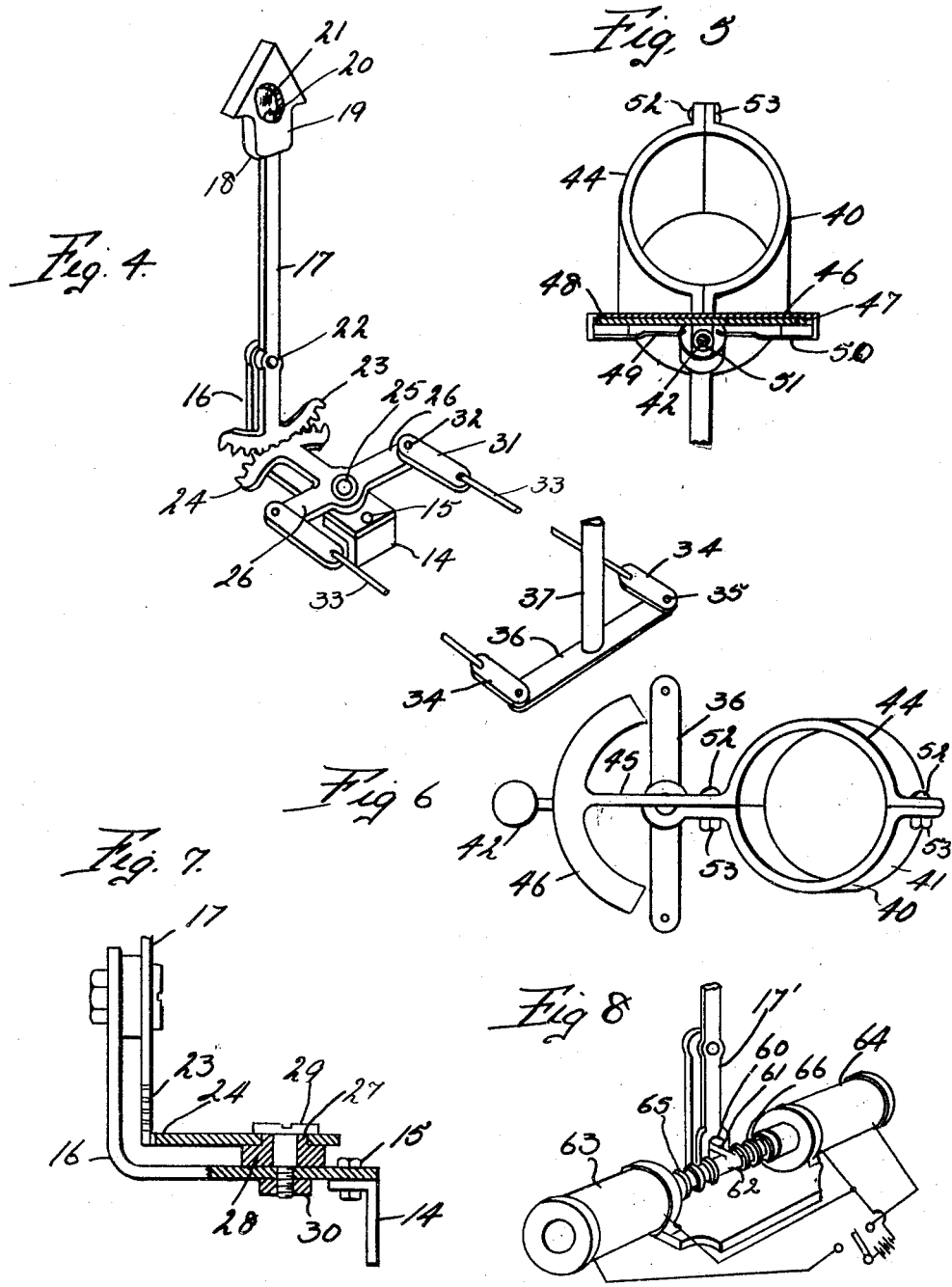

Patented Apr. 14, 1931

1,800,967

UNITED STATES PATENT OFFICE

MORRIS SUBBER, OF PHILADELPHIA, PENNSYLVANIA

AUTOMOBILE INDICATOR

Application filed May 19, 1928. Serial No. 279,109.

My invention relates to a new and useful improvement in an automobile indicator and has for one of its objects to provide a combination mechanical and electrical device of this character for indicating the intentions of the operator and to turn to the right or left or to stop the vehicle.

Another object of the invention is to generally improve the construction of automobile indicators whereby they may be readily operated from the driver's seat to produce a signal or indication at the back of the automobile.

Another object of the invention is to so arrange the operating mechanism that it may be manipulated either by hand or by the knees of the operator.

A further object of the invention is to so provide a unique structure for transmitting motion from the operator's station to the rear of the vehicle including parallel connecting means.

A still further object of my invention is to provide for electrically operating the semaphore in place of the mechanical operation thereof.

With these ends in view, this invention consists in the details of construction and combination of elements hereinafter set forth and then specifically designated by the claims.

In order that those skilled in the art to which this invention appertains may understand how to use and make the same, I will describe its construction in detail, referring by numerals to the accompanying drawing forming a part of this application, in which:

Fig. 1 is a plan view of an automobile chassis showing my indicating device connected therewith.

Fig. 2 is a side elevation thereof.

Fig. 3 is a diagram of the electrical circuit for the lights.

Fig. 4 is an enlarged fragmentary perspective view of the main mechanical parts of the indicator.

Fig. 5 is an enlarged rear elevation of the combined clamp switch with the operating handle broken away and shown in section.

Fig. 6 is an upper end or plan view of the bracket, switch, indicator operating rod and cross head.

Fig. 7 is an enlarged side elevation partly in section of the mechanism for transmitting motion to the semaphore, a portion of which is broken away.

Fig. 8 is a perspective view of a modification shown in connection with a diagram of the circuit for operating the modified device.

In carrying out the invention as herein embodied, 10 represents an automobile including the usual brake wheel 11 and steering column 12 surmounted by the steering wheel 13.

To any suitable part of the rear of the automobile is connected a bracket 14 here shown as an angle iron which may be set in different positions according to the locality in which it is used, and this is preferably connected by a single bolt 15 and its associated nut with an angle iron support 16 so that the latter may be adjusted to any desirable angle or position for placing the indicator within the line of vision of succeeding traffic.

On one arm of the angle iron 16, as for instance the upright one, is pivoted the shank or stem 17 of the semaphore 18 which also includes a head 19 preferably of arrow shape and of hollow construction for the reception of an electric lamp 20 and provided with a transparent face 21 through which the rays of light from the lamp 20 pass for producing the signals or indicators.

The semaphore being pivoted intermediate its ends as at 22 is provided at its lower end with a segmental gear 23 meshing at right angles with the coacting segmental gear 24 as plainly shown in Fig. 7.

The segmental gear 24 is pivoted at 25 to the other arm of the angle iron 16 and is provided with a pair of oppositely disposed arms 26.

Both the semaphore with its segmental gear 23 and the segmental gear 24 with its arms 26 are pivoted in the same manner being journalled upon the reduced end 27 of the bushing 28 which engages the angle iron to which it is fastened by a screw 29 having a reduced threaded end for threaded engagement with the angle iron and for the reception of a nut 30, it being understood that the head of the screw is of sufficient size to project beyond the sides of the reduced end and coact with the pivoted part for holding it in place.

To the outer ends of the arms 26 are pivotally connected the knuckles 31 as at 32 and to the ends of said knuckles free of the arms 26 are secured ends of connecting wires, cables or other equivalent, the opposite ends of said wires being connected with knuckles 34 which in turn are pivoted as at 35 to the ends of the cross bar 36.

The cross bar is secured intermediate its ends in any suitable manner to the lower end of the vertical rotating rod 37 rotatably mounted in the bearing 38 of the arm 39 formed with one of the sections 40 of the clamp bracket 41 and on the upper end of this rod is mounted a handle 42 by which said rod may be rotated either by the hand or knees of the operator of the vehicle since said handle is located directly beneath the steering wheel. The rotating rod 37 may be held against downward movement by a collar 43 mounted thereon and engaging the bearing 38.

The other section or member 44 of the clamp bracket has an arm 45 projecting therefrom which carries a suitable arcuate switch housing 46 in which may be mounted a contact 47 suitably insulated as indicated at 48 and at the ends of the casing are resilient movable contacts 49 and 50 terminating short of each other and short of the center of the casing and adapted to be actuated under certain conditions by a fiber roller 51 mounted on that portion of the handle 42 underlying the switch casing.

The clamp bracket is placed about the steering column 12 and secured in place by bolts 52 and their associated nuts 53.

The switch elements and the indicating and signal devices are electrically connected in any suitable or well-known manner with the lighting or other electrical system of the automobile and for convenience of illustration, I have shown a diagram in Fig. 3, illustrating the connections in which 54 represents a conductor leading from the electric lamp 20 to the movable switch contacts 49 and 50 associated with the stationary contact 47 which in turn is connected with one side of the source of electrical energy 55 here shown as a battery and the other side of said battery is connected with the lamp 20 by the ground 56. In series with this circuit is a dash lamp 57 to indicate that the parts are in operative condition when either of the switch contacts 49 and 50 is closed.

Shunted about the switch represented by the parts 47, 49 and 50 is another switch 58 which is operated by the foot brake pedal or associated parts, and hooked up in parallel with the lamp 20 is an audible signal 59 such as a bell.

From the foregoing description, it will be seen when it is desirable to indicate to succeeding traffic that the operator of the vehicle will turn to the right, the handle 42 is moved to the right hand side of the normal central position shown in Fig. 1, so that motion will be transmitted through the rod 37 and the connecting parts to the semaphore 18 so as to move the head thereof downward toward the right hand side and at the same time the roller 51 will depress the spring 50 until it contacts with the contact member 47, thus completing the circuit through the lamps 57 and 20 and the bell 59 which will light up the arrow head of the semaphore and produce an audible signal. The same action takes place when the handle 42 is moved to the left except that the semaphore is thrown down to the left hand side. If the operator of the vehicle intends to stay on the straight road but comes to a stop, then when the brake pedal is depressed, the switch 58 is closed so that the lamp in the semaphore will be lighted and an audible signal produced, thus indicating that he intends to bring the vehicle to a stand-still.

In Fig. 8, I have illustrated a modification which will electrically operate the semaphore in a manner similar to that described above wherein the shank of the semaphore is represented by the numeral 17' and is provided with a fork 60 at its lower end for registration with a lug 61 on the core 62 projecting into the two solenoids 63 and 64, said core being normally held in a central position by springs 65 and 66. One pole of each solenoid is electrically connected with one side of the switch in the casing 46 while the other pole of each solenoid is connected with the source of electrical energy and with another element of the switch so that when one side of the switch is closed, one solenoid will move the semaphore in one direction but if the other solenoid is energized, the semaphore will be moved in the other direction and as soon as the solenoids are de-energized by the opening of the switch, the spring will return the semaphore to the central upright position. With this form of the device the necessary visible and audible signals may be connected into the circuit and the brake pedal operated switch may also be utilized.

Of course I do not wish to be limited to the exact details of construction as herein shown, as these may be varied within the limits of the appended claims without departing from the spirit of my invention.

Having thus fully described my invention, what I claim as new and useful is:—

1. An automobile indicator comprising a semaphore pivoted intermediate its ends, a segmental gear formed therewith, a second segmental gear meshing with the first mentioned one, oppositely disposed arms carried by the second mentioned gear, a rotatable rod, a cross bar carried by said rod, means to transmit a parallel motion between said cross bar and the arms of the second mentioned gear, and means carried by the rod for rotating the same.

2. An automobile indicator comprising a semaphore pivoted intermediate its ends and adapted to normally remain in an upright position, a segmental gear formed with the lower end of said semaphore, the faces of said gear being in vertical planes, a second segmental gear pivoted to move in a substantially horizontal plane and meshing with the first mentioned gear, arms projecting from opposite sides of the pivotal point of the second named segmental gear, a cross bar parallel to the arms, means to oscillate said cross bar, means connected to the ends of the arms and corresponding ends of the cross bar whereby parallel motion is transmitted from the cross bar to the arms for actuating the semaphore through the segmental gears.

3. A device of the kind described, comprising, in combination, a semaphore pivoted intermediate its ends and normally remaining in an upright position for movement in a vertical plane to either side of the said vertical position, a segmental gear formed on the lower end thereof, a second segmental gear mounted in a horizontal position and meshing with the first mentioned segmental gear, oppositely disposed arms carried by the second mentioned segmental gear, a rod mounted to rotate, a cross bar carried by said rod to be moved with the rotation of the latter and cables connecting the ends of the cross bar with the outer ends of the arms, said cables running parallel with each other for transmitting a parallel motion from the cross bar to the arms whereby the second mentioned segmental gear is operated to actuate the semaphore for moving the latter to one side or the other of its upright position.

In testimony whereof, I have hereunto affixed my signature.

MORRIS SUBBER.